July 13, 1937.  E. P. BULLARD  2,086,850
BINDING DEVICE
Filed Nov. 27, 1935
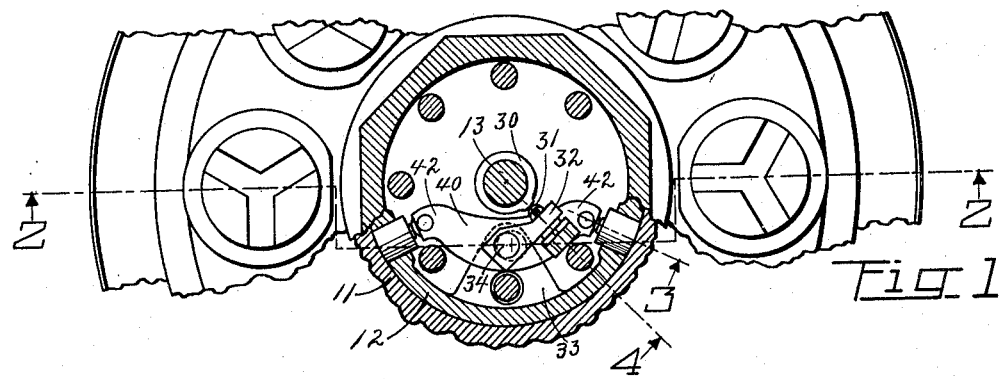
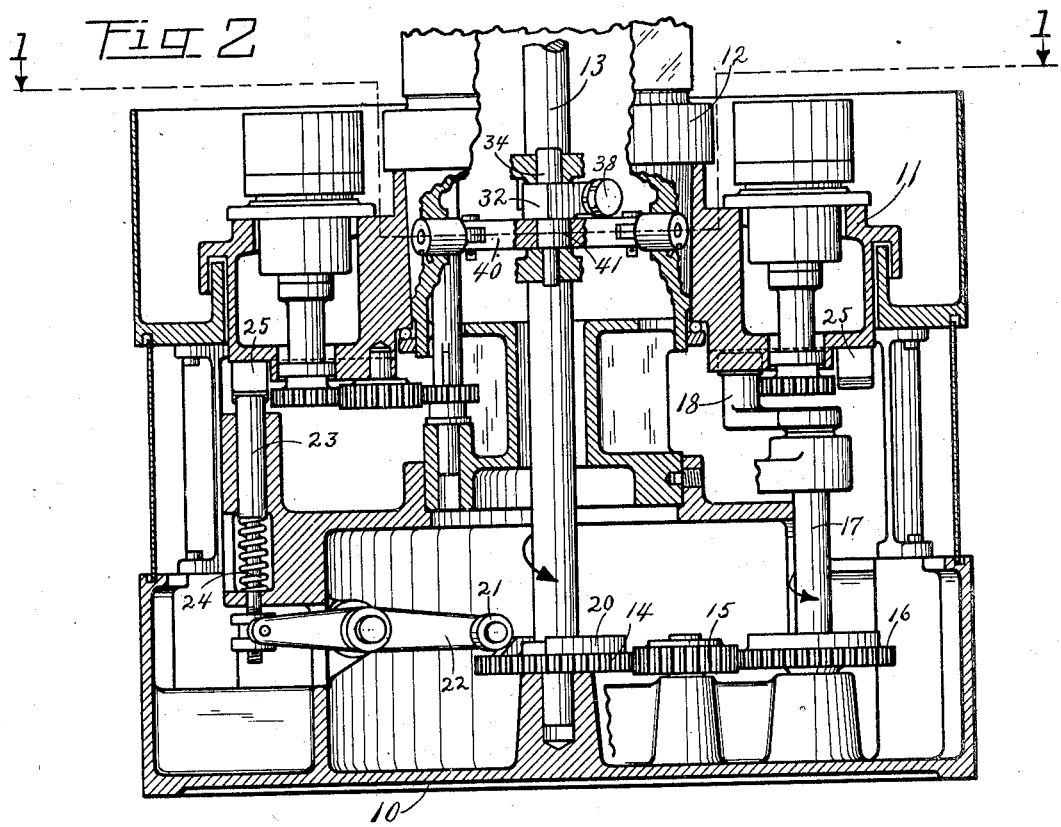
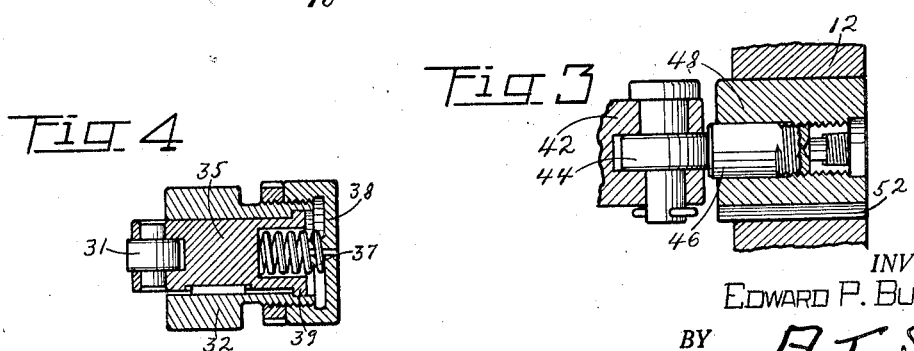
INVENTOR.
EDWARD P. BULLARD
BY A. T. Sperry
ATTORNEY Patented July 13, 1937

2,086,850

UNITED STATES PATENT OFFICE 2,086,850

BINDING DEVICE

Edward P. Bullard, Fairfield, Conn., assignor to The Bullard Company, a corporation of Connecticut Application November 27, 1935, Serial No. 51,735

15 Claims. (Cl. 29—49)

This invention relates to binding devices for preventing relative movement of elements of a machine, and particularly to a mechanism adapted for use on machine tools to prevent relative movement of indexible elements thereof during predetermined periods.

The invention is hereinafter described as employed in a multiple operation machine tool having a rotary work carrier indexible from one position to another, the present device being utilized for binding the carrier to a stationary column of the machine in predetermined timed relation between the indexing movement of the carrier. The invention may obviously be used in other relations and in other combinations with machine tools without departing from the scope of the invention.

One of the objects of the present invention is to provide a novel type of binding device for preventing relative movement of elements of machine tools or like mechanism.

Another object of the invention is to actuate a binding mechanism of a machine tool in synchronism with the operation of other instrumentalities thereof.

A further object of the invention is to bind an indexible work carrier of a multiple operation machine tool to the stationary column of the machine in a predetermined position and in predetermined timed relation to the operation of the indexing and/or lock pin mechanism thereof.

Another object is to provide a binding mechanism in which the binding forces are exerted at a multiplicity of points so as to balance the binding strains and preclude disalignment of parts as a result of the application of the binding forces.

Another object is to provide a binding mechanism for an annular carrier by which the carrier is secured to a central column by a locking action between the carrier and column at a plurality of points preferably equally spaced so as to evenly balance the binding forces.

Another object is to provide, in a device of the character set forth, a binding means wholly within the column; and further to provide a binding mechanism operable by and with the indexing mechanism so that, by a single instrumentality, indexing, binding and releasing are accomplished in the desired synchronous relationship.

These and other objects and features of the invention will be apparent from the following description thereof in which reference is made to the accompanying figures of the drawing illustrating a typical form and arrangement of elements embodying the present invention.

In the drawing:

Figure 1 is a horizontal sectional view of a portion of a machine tool having a typical arrangement of elements embodying the invention applied thereto, the section being taken on the line 1—1 of Figure 2;

Figure 2 is a vertical sectional view of the mechanism illustrated in Figure 1 taken on the line 2—2 thereof; and Figures 3 and 4 are sectional views of details of the construction illustrated in Figure 1 taken on the lines 3—3 and 4—4 thereof respectively.

That form of the invention hereinafter described and illustrated is applied to a multiple operation machine tool of the type described in the application for Machine tool, Serial No. 108,494, filed October 30, 1936, and embodies a rotatable cam element carried by a drive shaft by which the indexing mechanism is actuated to move, or index, the carrier from one operating station to another about the stationary column of the machine. A pivotally mounted actuator is engaged by the cam upon completion of each indexing movement of the carrier and is provided with an eccentrically located collar for moving a toggle yoke into forcible engagement with frictional binding elements located at spaced points about the column. The binding elements are mounted within that portion of the column which is surrounded by the carrier so that, when projected outwardly, they engage the adjacent face of the carrier to stop and bind the carrier in a predetermined position.

An important feature of the invention is the spacing of the binding members so as to distribute the binding action equally about the column. In the instant case, two binder elements are positioned about one-third the distance around the column while the column and carrier combine at a point mid-way between the elements to form a third point of binding force, thus to equally balance such forces in all directions.

Referring to the drawing, the invention is illustrated as applied to a vertical type of multiple operation machine tool having a base 10 within which is housed an indexing mechanism for moving a spindle carrier 11 from one position to another about a stationary column 12 of the machine. The indexing mechanism is driven from a shaft 13 by means of a gear 14, idler gear 15 and gear 16 on the lower end of an indexing crank shaft 17. An indexing crank 18 is secured to the upper end of the shaft 17 and is rotated thereby in timed relation to the periodic rotations of the drive shaft 13 to advance the carrier, with a Geneva-like motion, a fraction of a revolution with each complete rotation thereof, each increment of rotation depending upon the number of work holders on the carrier.

The gear 14 on the drive shaft 13 is provided with a lock pin actuating cam 20 which is movable to engage a roller 21 on the end of a lever 22 to rock the lever and retract a lock pin 23 against the action of a spring 24 so that it is moved downward out of engagement with adjustably located lock pin bits 25 on the lower face of the carrier. The locking and indexing mechanism illustrated may be of any suitable type of construction desired and may have other forms to be operated in other ways since the binding mechanism itself is adapted for use in combination with other types of indexing and locking devices.

As shown, the binding mechanism is actuated by the drive shaft 13 in synchronism with the operation of the indexing and locking elements by means of a cam 30 secured to the shaft 13, the cam being engageable with a roller 31 on an actuator arm 32. The arm 32 is secured to an actuator shaft 34 mounted in brackets 33 formed on the interior of the column 12 and has an actuating yoke 40 and binding elements 48 as hereafter more fully described.

In order to permit movement of the cam past the actuator arm and in order to vary the force exerted by the actuator arm, the roller 31 engaged by the cam is carried by a slidable plug 35 positioned through a stud 36 on the actuator arm 32, the plug 35 being urged outwardly by a spring 37 located in a recess in the plug and bearing against an adjustable cap 38. Outward movement of the plug is limited by a shoulder 39 on the inner end thereof while the exposed end of the plug carries the cam engaging roller 31. Adjustment of the spring tension by the cap 38 serves to alter the binding pressure applied by the action of the cam. The spring thus serves to cushion the action of the binding force as it is applied to the carrier, thereby reducing the shock on the carrier and column.

The yoke 40 is rotatably carried upon an eccentric portion 41 of the actuator shaft 34 whereby movement of the shaft, under the influence of the cam 30, will move the yoke outwardly whereupon rollers 44, carried by the oppositely extending arms 42 of yoke 40 will engage plugs 46 threadedly adjustable within binding elements 48 which are slidably mounted through the column 12, the outer ends being adapted for frictional engagement with the inner face of the carrier and rotation of the elements 48 being precluded by keys 52.

The force applied to the carrier by the binding mechanism is distributed and equalized by movement of the yoke since the yoke is pivotally mounted and pressure can not be applied to either of the friction elements until the rollers on both arms thereof have been brought into engagement with the threaded plugs 46 of both friction elements. Thereafter, the force exerted by the cam and actuator arm is applied equally to the friction elements through the arms of the yoke and is distributed uniformly thereby to both friction elements.

The actuation of the binder by and with the indexing and lock pin actuating shaft provides a simple automatic synchronism between parts, thus insuring the locking and unlocking in accurate relation with the indexing cycle.

Although the above described combination of the binding mechanism with the features of certain preferred indexing and positioning means facilitates accurate location of the work, with respect to the tools of a multiple operation machine tool, the invention is applicable to other types of mechanism to prevent relative movement thereof or to overcome momentum of moving elements. The invention may also be embodied into other elements of machine tools and may be changed in form and arrangement of the parts to adapt the principles thereof to other structures and for use in other combinations.

In view thereof, it should be understood that the typical form of the invention shown in the drawing, and herein described, is intended for the purposes of illustration and is not intended to limit the scope of the invention.

Having set forth the nature of my invention, what I claim is:

1. In a machine tool including an annular indexible carrier and a cylindrical column upon which said carrier is mounted, an indexing means for the carrier, a shaft extending through said column for operating said indexing means, a binder mechanism within said column operable by said shaft to exert binding force between said carrier and column at the expiration of the indexing movement and independent means operable by said shaft to lock said carrier.

2. A binding device for relatively movable members of a machine comprising a plurality of binding elements carried by one member and movable to engage the other member, drive means for one of said members and mechanism operated by said drive means for actuating said binding elements including a member through which force is applied equally to each of said binding elements.

3. In a machine tool having a stationary column and an indexible member movable about said column, drive means for indexing said member and a binding device for stopping movement of said member actuated by said drive means including a plurality of binding elements, a cam actuated by said drive means, an actuator arm for engaging said cam and a yoke movable by said actuator arm to engage each of said binding elements.

4. A multiple operation machine tool having a stationary column, a carrier indexible about said column, indexing mechanism for moving said carrier, a drive shaft for said mechanism and a binding device for binding said carrier in a predetermined position comprising a cam driven by said drive shaft, a plurality of spaced binding elements carried by said column and movable to engage said carrier and means actuated by said cam for forcing all of said binding elements into engagement with said carrier.

5. A multiple operation machine tool having a stationary column, a carrier indexible about said column, indexing mechanism for moving said carrier, a drive shaft for said mechanism and a binding device for binding said carrier in a predetermined position comprising a cam driven by said drive shaft, a plurality of spaced binding elements carried by said column and movable to engage said carrier and an equalizing member movable on rotation of said cam into engagement with each of said binding elements to urge the same into engagement with the carrier with equal force.

6. A multiple operation machine tool having a column, a work carrier indexible about said column, indexing mechanism therefor and a binding device actuated in synchronism with said indexing mechanism including binding elements, a yoke engaging the binding elements and an actuator arm for the yoke having an eccentric member movable in timed relation to said indexing mechanism to urge the yoke against said binding elements.

7. In a machine tool including a rotatable work carrier, a stationary support therefor and the combination of a pivotedly mounted binder member mounted with the stationary support and having spaced extremities adapted to exert binding pressure between the carrier and the support and means for bodily moving the arm to exert such binding pressure.

8. In a machine tool including a rotatable work carrier, a stationary support therefor, means for periodically indexing the carrier and the combination of a pivotedly mounted binder member mounted with the stationary support and having spaced extremities adapted to exert binding pressure between the carrier and the support and means for bodily moving the arm to exert such binding pressure, said means being operable with the operation of the indexing means.

9. In a machine tool having a stationary column, a rotatable work carrier mounted thereon and means for securing the carrier to the column including a plurality of spaced binding members radially movable through the column to engage said carrier and secured against rotation.

10. In a machine tool having a stationary column, a rotatable work carrier mounted thereon, means for securing the carrier to the column including a plurality of spaced binding members radially movable through the column to engage said carrier and secured against rotation and a single means for exerting equal force on said binding members.

11. In a machine tool having a stationary column, a rotatable work carrier mounted thereon, means for securing the carrier to the column including a plurality of spaced binding members radially movable through the column to engage said carrier and secured against rotation and a single means for exerting equal force on said binding members, said means including a pivotedly mounted bodily movable arm, the ends of which engage said members.

12. In a machine tool including a stationary column having a circular outer face and a rotatable work carrier mounted on said face, means extending through said column for periodically indexing said carrier and binding means operable thereby including a plurality of spaced binding elements operable to exert binding forces at spaced points between said column and said carrier.

13. In a machine tool including a stationary column having a circular outer face and a rotatable work carrier mounted on said face, means extending through said column for periodically indexing said carrier and binding means operable thereby including a plurality of spaced binding elements operable to exert binding forces at spaced points between said column and said carrier, said means including a pivoted member operable to equalize the forces exerted at said spaced points.

14. In a machine tool a stationary column, a carrier rotatably mounted thereon, means for periodically indexing the carrier, with respect to the column, binding means for securing the carrier against indexing movement and including a cam operable with the indexing means, a bodily movable arm actuated by the cam and individual adjustably spaced binding plugs extending through the column and movable by bodily movement of said arm to engage the carrier and secure said carrier against indexing movement.

15. In a machine tool a stationary column, a carrier rotatably mounted thereon, means for periodically indexing the carrier, with respect to the column, binding means for securing the carrier against indexing movement and including a cam operable with the indexing means, a bodily movable arm actuated by the cam and individual adjustably spaced binding plugs extending through the column and movable by bodily movement of said arm to engage the carrier and secure said carrier against indexing movement and means for equalizing the pressure exerted on said plugs by said arm.

EDWARD P. BULLARD.